(12) United States Patent
Ditmyer et al.

(10) Patent No.: US 7,831,879 B2
(45) Date of Patent: Nov. 9, 2010

(54) GENERATING TEST COVERAGE BIN BASED ON SIMULATION RESULT

(75) Inventors: Bruce J. Ditmyer, Westford, VT (US); Susan Farmer Bueti, Waterbury, VT (US); Jonathan P. Ebbers, Essex Junction, VT (US); Suzanne Granato, Essex Junction, VT (US); Francis A. Kampf, Jeffersonville, VT (US); Barbara L. Powers, Hinesburg, VT (US); Louis Stermole, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/033,239

(22) Filed: Feb. 19, 2008

(65) Prior Publication Data
US 2009/0210746 A1 Aug. 20, 2009

(51) Int. Cl.
*G06F 11/00* (2006.01)
(52) U.S. Cl. .......... 714/741; 714/26; 714/724; 714/739; 714/723; 714/728; 714/718; 714/720; 714/37; 714/33; 716/4; 716/5
(58) Field of Classification Search ............ None
See application file for complete search history.

(56) References Cited

U.S. PATENT DOCUMENTS

| | | | |
|---|---|---|---|
| 5,202,889 A * | 4/1993 | Aharon et al. ........... 714/739 |
| 6,212,667 B1 * | 4/2001 | Geer et al. ........... 716/6 |
| 6,334,199 B1 * | 12/2001 | Ono et al. ........... 714/728 |
| 6,742,166 B2 * | 5/2004 | Foster et al. ........... 716/4 |
| 7,007,251 B2 | 2/2006 | Hekmatpour |
| 7,089,474 B2 * | 8/2006 | Burdine et al. ........... 714/738 |
| 7,225,377 B2 * | 5/2007 | Ishida et al. ........... 714/738 |
| 7,254,764 B2 * | 8/2007 | Ishida et al. ........... 714/738 |
| 7,278,056 B2 * | 10/2007 | Hekmatpour ........... 714/37 |
| 7,299,447 B2 * | 11/2007 | Spirkl ........... 717/112 |
| 2001/0010091 A1 * | 7/2001 | Noy ........... 716/4 |
| 2003/0018945 A1 | 1/2003 | Foster et al. |
| 2003/0121011 A1 | 6/2003 | Carter |
| 2005/0102596 A1 * | 5/2005 | Hekmatpour ........... 714/741 |
| 2006/0107141 A1 * | 5/2006 | Hekmatpour ........... 714/724 |

* cited by examiner

*Primary Examiner*—John P Trimmings
(74) *Attorney, Agent, or Firm*—Richard Kotulak; Hoffman Warnick LLC

(57) ABSTRACT

A solution for generating functional coverage bins for testing a device is disclosed. A method includes: receiving information of a failing test generated from a random simulation performed on the device; tracing a first sequence of signal events that happened in the failing test; correlating the signal events to coverage bins to generate a sequence of coverage bins; creating cross coverage event sequence bins based on the sequence of coverage bins; and outputting the created coverage event sequence bins for testing the device.

21 Claims, 2 Drawing Sheets

GENERATING TEST COVERAGE BIN BASED ON SIMULATION RESULT

BACKGROUND OF THE DISCLOSURE

1. Technical Field

The disclosure relates generally to integrated circuit design, and more particularly to testing an integrated circuit design.

2. Background Art

Functional coverage indicates the thoroughness of a testing of an integrated circuit device. As integrated circuit design becomes larger and more complex, the testing process consumes time and resources, which may substantially hamper the introduction of new products into the market. As such, efforts need to be made to improve the efficiency of testing through, for example, optimizing functional coverage specification/design. Functional coverage bins (hereinafter "coverage bins"), used herein according to the generally accepted meaning(s) in the testing art, are generally used as a metric for determining whether all of the required stimuli have been applied to the device under test (DUT). A coverage bin is a part of a coverage definition of a testing program code (adapted to a simulation language, e.g., a Verilog simulator), which declares a specific behavior (or status) of a state variable. Each coverage bin may include a unique bin name.

Conventionally, functional coverage and/or the coverage bins in the testing program must be manually specified in the testing design stage. However, some failure tests may not be related to a particular stimulus event, but a sequence of them. The stimuli sequence is very difficult to determine when writing the coverage bins because dependencies among various stimulus events are not known beforehand.

Conventional approaches provide solutions to generate coverage bins based on product design specifications. In addition, there are solutions which process coverage data and determine whether existing coverage bins are satisfied/covered in a test. However, no solution exists which generates coverage bins from constrained random simulation test result(s).

SUMMARY OF THE DISCLOSURE

In a first embodiment, there is a method for generating functional coverage bins for testing a device. The method comprises: receiving information of a failing test generated from a random simulation performed on the device; tracing a first sequence of signal events that happened in the failing test; correlating the signal events to coverage bins to generate a sequence of coverage bins; creating cross coverage event sequence bins based on the sequence of coverage bins; and outputting the created coverage event sequence bins for testing the device In a second embodiment, there is a system for generating functional coverage bins for testing a device. The system comprises: means for receiving information of a failing test generated from a random simulation performed on the device; means for tracing a first sequence of signal events that happened in the failing test; means for correlating the signal events to coverage bins to generate a sequence of coverage bins; and means for creating cross coverage event sequence bins based on the sequence of coverage bins.

In a third embodiment, there is a computer program product for generating functional coverage bins for testing a device. The computer program product comprises: computer usable program code stored in a computer readable medium, which when executed by a computer system enables the computer system to: receive information of a failing test generated from a random simulation performed on the device; trace a first sequence of signal events that happened in the failing test; correlate the signal events to coverage bins to generate a sequence of coverage bins; create cross coverage event sequence bins based on the sequence of coverage bins; and output the created coverage event sequence bins for testing the device.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE DRAWINGS

The embodiments of this disclosure will be described in detail, with reference to the following figures, wherein like designations denote like elements, and wherein.

It is noted that the drawings of the disclosure are not to scale. The drawings are intended to depict only typical aspects of the disclosure, and therefore should not be considered as limiting the scope of the disclosure. In the drawings, like numbering represents like elements among the drawings.

DETAILED DESCRIPTION OF THE DISCLOSURE

The current disclosure provides a solution(s) for automatically generating coverage bins based on constrained random simulation test results. The following detailed description of embodiments refers to the accompanying drawings, which illustrate specific embodiments of the disclosure. Other embodiments having different structures and operations do not depart from the scope of the present disclosure.

1. System

Figure 1:
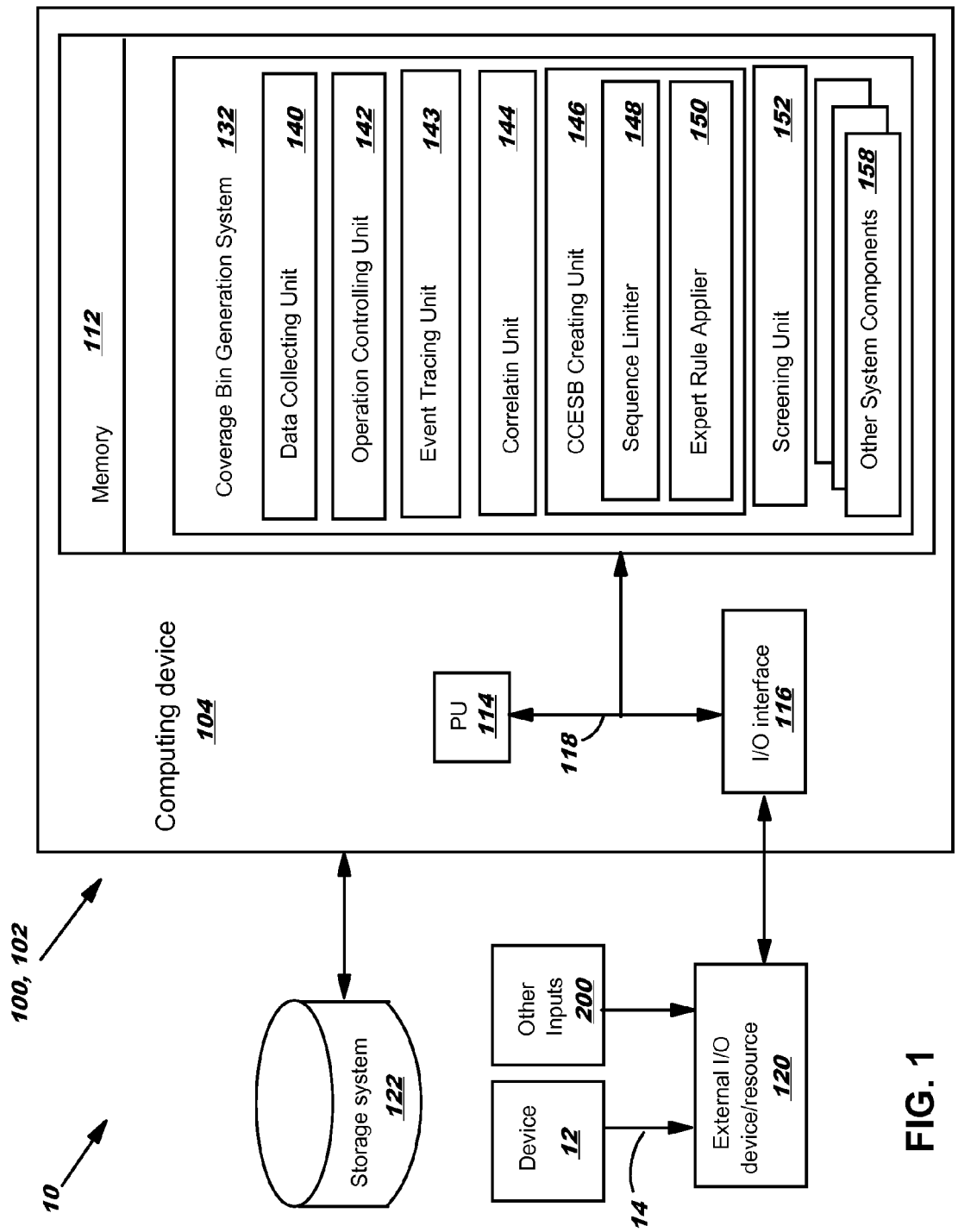
FIG. 1 shows a schematic view of a system including a coverage bin generation system according to one embodiment of the disclosure.

FIG. 1 shows an illustrative system 10. System 10 includes a computer environment 100 for, e.g., generating coverage bins to test a device 12. Device 12 is also associated to computer 100 through messages 14. Messages 14 may include a result(s) of random simulation test performed on device 12. Computer environment 100 may process the simulation test results and generate coverage bins for further testing device 12. To this extent, computer environment 100 includes a computer infrastructure 102 that can perform the various processes described herein for generating coverage bins. In particular, computer infrastructure 102 is shown including a computing device 104 that comprises a coverage bin generation system 132, which when executed by computer device 104 enables computing device 104 to perform the process(es) described herein.

Computing device 104 is shown including a memory 112, a processing unit (PU) 114, an input/output (I/O) interface 116, and a bus 118. Further, computing device 104 is shown in communication with an external I/O device/resource 120 and a storage system 122. In general, PU 114 executes computer program code, such as coverage bin generation system 132, that is stored in memory 112 and/or storage system 122. While executing computer program code, PU 114 can read and/or write data to/from memory 112, storage system 122, and/or I/O interface 116. Bus 118 provides a communications link between each of the components in computing device 104. I/O interface 116 can comprise any device that enables a user to interact with computing device 104 or any device that enables computing device 104 to communicate with one or more other computing devices. External I/O device/resource 120 can be coupled to the system either directly or through I/O interface 116.

In any event, computing device 104 can comprise any general purpose computing article of manufacture capable of executing computer program code installed thereon. However, it is understood that computing device 104 and coverage bin generation system 132 are only representative of various possible equivalent computing devices that may perform the various processes of the disclosure. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the disclosure. For example, in an embodiment, computer infrastructure 102 comprises two or more computing devices that communicate over any type of wired and/or wireless communications link, such as a network, a shared memory, or the like, to perform the various processes of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

Coverage bin generation system 132 includes a data collecting unit 140; an operation controlling unit 142; an event tracing unit 143; a correlating unit 144; a cross coverage event sequence bins (CCESB) creating unit 146 including a sequence limiter 148 and an expert rule applier 150; a screening unit 152; and other system components 158. Other system components 158 may include any now known or later developed parts of a computer system required for coverage bin generation system 132 but not individually delineated herein and understood by those skilled in the art. As should be appreciated, components of computer infrastructure 102 and/or coverage bin generation system 132 may be located at different physical locations or at the same physical location.

Memory 112 and/or storage system 122 may store a database of functional coverage bins for testing device 12 and other coverage bins, for example, coverage bins proved not to be related to a device 12 failure. In addition, coverage bin generation system 132 may be stored and/or deployed in memory 112 and/or storage system 122.

Inputs to computer infrastructure 102, e.g., through external I/O device/resource 120 and/or I/O interface 116, may include message 14 and/or other inputs 200. Other inputs 200 may include any available information required for the operation of coverage bin generation system 132. For example, other inputs 200 may include the existing coverage bins for testing device 12 and/or the design specification of device 12. As described herein, message 14 may include results of a random simulation test(s) performed on device 12. The results may include a passing test(s) and/or a failing test(s). A failing test refers to a simulation test under which device 12 fails to meet a design specification/expectation. A passing test refers to a simulation test under which device 12 meets the design specification(s)/expectation(s). The input data may be collected by data collecting unit 140 and may be analyzed by coverage bin generation system 132. Outputs of computer infrastructure 102 may include newly generated coverage bins, which may be used in, for example, further testing of device 12. For example, the testing program may be revised accordingly to make sure that the newly generated coverage bins are hit/covered in a further test. The operation of coverage bin generation system 132 will be described herein in detail.

2. Coverage Bin Generation System

Figure 2:
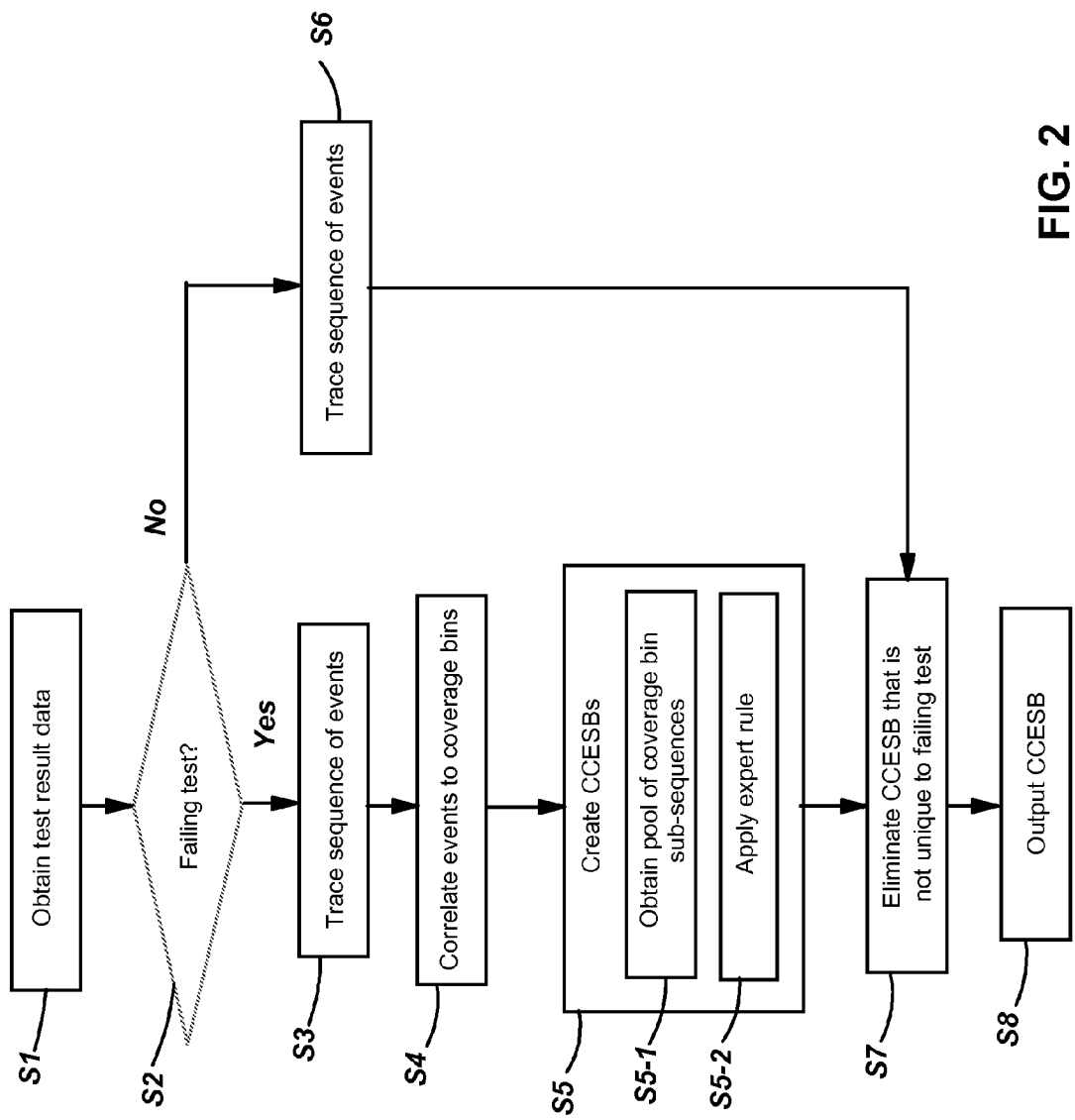
FIG. 2 shows a flow diagram of the operation of the coverage bin generation system according to one embodiment of the disclosure.

FIG. 2 shows one embodiment of the operation of coverage bin generation system 132. Referring now to FIGS. 1-2, collectively, in process S1, data collecting 140 collects data required for the operation. For example, results of a constrained random simulation test conducted on device 12 (usually referred to as device under test "DUT") may be collected. The results may include information regarding whether device 12 passes or fails the test and other information, e.g., state events (behaviors) of state variables that occur following the application of the constrained random stimuli onto device 12. It should be appreciated that data collecting unit 140 does not necessarily receive random simulation testing data from an outside source (as exemplarily shown in FIG. 1). Coverage bin generation system 132 may include a simulation component that may conduct a constrained random simulation on device 12, and data collecting unit 140 may just obtain the data from the simulation component.

In process S2, operation controlling unit 142 determines whether a random simulation test is a passing test or a failing test. For a failing test (i.e., "Yes" at S2), operation controlling unit 144 directs the operation to process S3 to process the test result(s). For a passing test (i.e., "No" at S2), operation controlling unit 142 directs the operation to process S6 to process the test result(s).

In process S3, event tracing unit 143 traces a (first) sequence of signal events that happened in the falling test. A signal event refers to a detected behavior of a state variable of device 12 following the application of the stimulus in the failing test. Any solution may be used in the tracing. It should be appreciated that the information regarding the sequence of signal events may already be included in the collected information in process S1. To this extent, the tracing may include rearranging the already provided event sequence information or may include just taking/accepting the provided event sequence information. That is, event tracing unit 143 may not necessarily actually "trace" an event sequence if the event sequence is already available.

In process S4, correlating unit 144 correlates the signal events to coverage bins. Any solution may be used to implement the correlation. For example, correlating unit 144 may correlate a signal event with coverage bins that cross the signal event and the time thereof. For example, the coverage bin may include an event which represents that the signal event happens at a time with a certain value. Correlating unit 144 may also correlate a signal event with a coverage bin(s) that is related to the signal in the respective sequence. The time referenced in the correlating may be absolute time, cycle based time or a time relative to a time window. In addition, because the signal events are traced as a sequence in process S3, the correlated coverage bins are also related to one another as a sequence. That is, each coverage bin is recorded with respect to other coverage bins in a sequence. It should be appreciated that the correlating also includes the situation that a coverage bin is generated to correspond to a signal event.

In process S5, CCESB creating unit 146 creates cross coverage event sequence bins (CCESBs). A CCESB is a sub-sequence of coverage bins obtained through changing the sequence of coverage bins obtained in process S4 (a CCESB may be the sequence of the coverage bins itself). To this extent, process S5 may include multiple sub-processes. In process S5-1, CCESB creating unit 146 may obtain a pool of coverage bin sub-sequences that correspond to all possible permutations of the sequence of coverage bins. For example, assume the sequence of coverage bins includes coverage bins A-B-C-D in the listed order. The sub-sequences may include A-B, A-C, A-D, A-B-C, A-B-D, A-C-D, B-C-D, B-C, B-D, . . . , and A-B-C-D, i.e., all possible permutation combinations of coverage bins A, B, C, D in the sequence order.

According to an embodiment, sequence limiter 148 may set a maximum length for a sub-sequence. For example, following the above example, sequence limiter 148 may set a length limit of 2 coverage bins. Applying this length limit, sequence limiter 148 may filter the pool of sub-sequences so as to include only sub-sequences A-B, A-C, A-D, B-C, B-D and C-D. In addition, sequence limiter 148 may also set a limit on the maximum number of sub-sequences (in the pool) to be further processed.

In sub-process S5-2, expert rule applier 150 applies a provided expert rule to further eliminate irrelevant coverage bin sub-sequences. The expert rule may identify an irrelevant coverage bin sub-sequence using any standard. For example, the expert rule may identify an irrelevant sub-sequence as including coverage bins not related by value. For example, the expert rule may find that coverage bin sub-sequence C-D does not affect connection logic and thus is irrelevant. The expert rule may also identify an irrelevant coverage bin sub-sequence as including coverage bins not related by a specific (specified) order. For example, the expert rule may determine that coverage bins A after B, i.e., A-B, is possible, but B after A is not, i.e., irrelevant. The expert rule may be provided by an outside source (e.g., device 12 designer) or may be created by expert rule applier 150 based on device 12 design and testing requirements/specifications. Applying the expert rule, expert rule applying unit 150 may eliminate irrelevant coverage bin sub-sequences and the residual sub-sequences in the pool will be the CCESBs that deserve further processing.

In process S6, optionally, a passing test may be processed similarly as in processes S3-S5 to obtain CCESBs in the passing test. That is, a sequence of signal events (second sequence) will be traced, correlated to coverage bins, and CCESBs will be obtained from the sequence of the related coverage bins.

In process S7, screening unit 152 further filters the CCESBs obtained in process S5 (failing test) by eliminating CCESBs that are not unique to a failing test. The underlying reason is that if a CCESB exists in a passing test, the CCESB will not cause a failure in the failing test. Any solution/method may be used in the screening. For example, the CCESBs generated from the failing test operation (S3-S5) may be compared with the CCESBs generated from the passing test operation (S6), and if a CCESB exists in both the failing test and the passing test, the CCESB will be eliminated as being not unique. For another example, a passing test may be run on device 12 with the CCESBs generated from the failing test processing (S3-S5), and if a CCESB is hit/covered in the test, the CCESB is eliminated as being not unique.

In process S8, the residual CCESBs after the screening/filtering of process S7 will be output to a user or an automatic testing component to be covered in the testing program code. As such the CCESBs will be hit/covered in the further testing of device 12 to, e.g., make sure that the failures causes by the CCESBs are avoided/cured.

The following exemplary operation further illustrates the processes. Assume that a device 12 include the following example DUT interfaces:
    chip_select
    write_addr[2:0]
    write_data[3:0]
    read_addr[2:0]
    read_data[3:0]
    write_enable
    read_enable
    clock and the coverage bins may be prepared as follows:
    write all address locations with all data values
    cross write (chip_select,addr,data)
    read all address locations
    cross read (chip_select,addr)

Batch simulation may be run on device 12 to get collection of passing & failing tests (i.e., seeds) as follows:
    test wrote addr 4 of bank 0 with A, then read addr 4 of bank 0 and the read data matched expect (PASS)
    test wrote addr 4 of bank 0 with A, then read addr 3 of bank 1 and the read data matched expect (PASS)
    test wrote addr 4 of bank 0 with A, then read addr 3 of bank 0 and the read data did not match expect (FAIL).

For each failing test, data trace may be generated and correlated to coverage bins to get correlation information that contains when each bin was hit relative to time (by cycle). Then, every coverage bin may be recorded with respect to the other coverage bin to generate a coverage bin sequence:
    write(0,2,A); read(0,3); write(0,4,A); read(0,4);
    write(1,7,A); read(0,2); write(0,4,A); read(1,3);
    write(0,2,A); read(1,7); write(0,4,A); read(0,3); (FAIL)
    An expert rule(s) may be provided as follows:
    accesses to bank 0 have no affect on access to bank 1 (and visa-vera).

And sequence limitations may be N=2 (max number of events in sequence) and M=4 (number of sequences to analyze). Applying the sequence limitation to change the coverage bin sequence, the sub-sequences may be created as:
    1. write(0,2,A); read(1,7);
    2. write(0,2,A); write(0,4,A);
    3. write(0,2,A); read(0,3);
    4. read(1,7); write(0,4,A);
    5. read(1,7); read(0,3);
    6. write(0,4,A); read(0,3);

Applying the expert rules, the following CCESBs are deemed irrelevant and are eliminated:
    2. write(0,2,A); write(0,4,A);
    3. write(0,2,A); read(0,3);
    6. write(0,4,A); read(0,3);

And CCESBs 1, 4, and 5 above are used for further testing device 12.

3. Conclusion

While shown and described herein as a method and system for generating functional coverage bins for testing a device, it is understood that the disclosure further provides various alternative embodiments. For example, in an embodiment, the disclosure provides a program product stored on a computer-readable medium, which when executed, enables a computer infrastructure to generate functional coverage bins for testing a device. To this extent, the computer-readable medium includes program code, such as coverage bin generation system 132 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 1) and/or storage system 122 (FIG. 1), and/or as a data signal traveling over a network (e.g., during a wired/wireless electronic distribution of the program product).

It should be appreciated that the teachings of the present disclosure could be offered as a business method on a subscription or fee basis. For example, a system 10 (FIG. 1), a computing device 104 comprising coverage bin generation system 132 (FIG. 1) could be created, maintained and/or deployed by a service provider that offers the functions described herein for customers. That is, a service provider could offer to generate functional coverage bins for testing a device as described above.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The following claims are in no way intended to limit the scope of the disclosure to the specific embodiments described herein.

What is claimed is:

1. A method for generating functional coverage bins for testing a device, the method comprising:
  receiving information of a failing test generated from a random simulation test performed on the device;
  tracing a first sequence of signal events that happened in the failing test;
  correlating the first sequence of signal events to coverage bins to generate a sequence of coverage bins;
  creating cross coverage event sequence bins based on the sequence of coverage bins; and
  outputting the created cross coverage event sequence bins for testing the device.

2. The method of claim 1, wherein the creating includes:
  obtaining a pool of coverage bin sub-sequences corresponding to possible permutations of the sequence of coverage bins;
  providing an expert rule for eliminating an irrelevant coverage bin sub-sequence; and
  applying the expert rule to generate the cross coverage event sequence bins.

3. The method of claim 2, wherein the expert rule identifies at least one of:
  a) coverage bins that are not related by value; or
  b) coverage bins that are not related by a preset order in sequence.

4. The method of claim 2, wherein the obtaining includes setting a maximum number of coverage bins included in a coverage bin sub-sequence.

5. The method of claim 1, further comprising eliminating cross coverage event sequence bins that are not unique to a failing test.

6. The method of claim 5, wherein the eliminating includes running a passing test on the device with the cross coverage event sequence bins, and eliminating the cross coverage event sequence bins in response to them being covered in the passing test.

7. The method of claim 5, wherein the eliminating includes processing a passing test performed on the device to trace a second sequence of signal events, and determining eliminating the cross coverage event sequence bins based on the second sequence of signal events.

8. A system for generating functional coverage bins for testing a device, the system comprising:
  means for receiving information of a failing test generated from a random simulation test performed on the device;
  means for tracing a first sequence of signal events that happened in the failing test;

means for correlating the first sequence of signal events to coverage bins to generate a sequence of coverage bins; and means for creating cross coverage event sequence bins based on the sequence of coverage bins.

9. The system of claim 8, wherein the creating includes:

means for obtaining a pool of coverage bin sub-sequences corresponding to possible permutations of the sequence of coverage bins; and means for applying a provided expert rule to eliminate an irrelevant coverage bin sub-sequence to generate the cross coverage event sequence bins.

10. The system of claim 9, wherein the expert rule identifies at least one of:

a) coverage bins that are not related by value; or b) coverage bins that are not related by a preset order in sequence.

11. The system of claim 9, wherein the obtaining means includes means for setting a maximum number of coverage bins included in a coverage bin sub-sequence.

12. The system of claim 8, further comprising means for eliminating cross coverage event sequence bins that are not unique to a failing test.

13. The system of claim 12, wherein the eliminating means controls running a passing test on the device with the cross coverage event sequence bins, and eliminates the cross coverage event sequence bins in response to them being covered in the passing test.

14. The system of claim 12, wherein the eliminating means determines eliminating the cross coverage event sequence bins based on a provided second sequence of signal events obtained by processing a passing test performed on the device.

15. A computer program product for generating functional coverage bins for testing a device, the computer program product comprising:

computer usable program code stored in a computer readable storage medium, which when executed by a computer system enables the computer system to:

receive information of a failing test generated from a random simulation test performed on the device;

trace a first sequence of signal events that happened in the failing test;

correlate the first sequence of signal events to coverage bins to generate a sequence of coverage bins;

create cross coverage event sequence bins based on the sequence of coverage bins; and output the created cross coverage event sequence bins for testing the device.

16. The program product of claim 15, wherein the program code is further configured to enable the computer system to:

obtain a pool of coverage bin sub-sequences corresponding to possible permutations of the sequence of coverage bins; and apply a provided expert rule to eliminate an irrelevant coverage bin sub-sequence to generate the cross coverage event sequence bins.

17. The program product of claim 16, wherein the expert rule identifies at least one of:

a) coverage bins that are not related by value; or b) coverage bins that are not related by a preset order in sequence.

18. The program product of claim 16, wherein the program code is further configured to enable the computer system to set a maximum number of coverage bins included in a coverage bin sub-sequence.

19. The program product of claim 15, wherein the program code is further configured to enable the computer system to eliminate cross coverage event sequence bins that are not unique to a failing test.

20. The program product of claim 19, wherein the program code is further configured to enable the computer system to at least one of:

run a passing test on the device with the cross coverage event sequence bins, and eliminate the cross coverage event sequence bins in response to them being covered in the passing test; or determine eliminating the cross coverage event sequence bins based on a provided second sequence of signal events obtained by processing a passing test performed on the device.

21. A computer program product for generating functional coverage bins for testing a device, the computer program product comprising:

computer usable program code stored in a non-transitory computer readable medium, which when executed by a computer system enables the computer system to:

receive information of a failing test generated from a random simulation test performed on the device;

trace a first sequence of signal events that happened in the failing test;

correlate the first sequence of signal events to coverage bins to generate a sequence of coverage bins;

create cross coverage event sequence bins based on the sequence of coverage bins; and output the created cross coverage event sequence bins for testing the device.

* * * * *